(12) United States Patent
Shin et al.

(10) Patent No.: US 12,182,981 B2
(45) Date of Patent: Dec. 31, 2024

(54) IMAGE PROCESSING APPARATUS AND OPERATING METHOD OF THE SAME

(71) Applicant: SAMSUNG ELECTRONICS CO., LTD., Suwon-si (KR)

(72) Inventors: Hanul Shin, Suwon-si (KR); Soomin Kang, Suwon-si (KR); Iljun Ahn, Suwon-si (KR); Youngchan Song, Suwon-si (KR); Tammy Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 334 days.

(21) Appl. No.: 17/687,227

(22) Filed: Mar. 4, 2022

(65) Prior Publication Data

US 2022/0284565 A1   Sep. 8, 2022

Related U.S. Application Data

(63) Continuation of application No. PCT/KR2022/002064, filed on Feb. 11, 2022.

(30) Foreign Application Priority Data

Mar. 4, 2021   (KR) .......................... 10-2021-0029088
Jul. 15, 2021   (KR) .......................... 10-2021-0093137

(51) Int. Cl.
*G06T 7/00* (2017.01)
(52) U.S. Cl.
CPC .. *G06T 7/0002* (2013.01); *G06T 2207/10024* (2013.01); *G06T 2207/20021* (2013.01);
(Continued)
(58) Field of Classification Search
None
See application file for complete search history.

(56) References Cited

U.S. PATENT DOCUMENTS 8,855,213 B2   10/2014   Filippini et al.
10,013,772 B2   7/2018   Carmel et al.
(Continued)

FOREIGN PATENT DOCUMENTS

JP   2007-096431 A   4/2007
KR   10-2018-0044742 A   5/2018
(Continued)

OTHER PUBLICATIONS

Uchida, et al., "Pixelwise JPEG Compression Detection and Quality Factor Estimation Based on Convolutional Neural Network", 2019, Society for Imaging Science and Technology, 7 pages total.
(Continued)

*Primary Examiner* — Vikkram Bali
(74) *Attorney, Agent, or Firm* — Sughrue Mion, PLLC

(57) ABSTRACT

An image processing apparatus and a method of operating the same are provided. The method includes: a memory storing one or more instructions; and a processor configured to execute the one or more instructions stored in the memory to obtain first frequency coefficient information by converting a first image into a frequency domain in units of blocks having a preset size, obtain correlation information indicating a correlation between at least one block of the first frequency coefficient information and a first kernel, generate a weight corresponding to the first frequency coefficient information based on the correlation information, generate second frequency coefficient information by rearranging coefficients included in the first frequency coefficient information, wherein the one or more of the coefficients having a same frequency is arranged into a same group, and obtain quality information of the first image based on the weight and the second frequency coefficient information.

12 Claims, 10 Drawing Sheets

(52) U.S. Cl.
CPC ............ *G06T 2207/20052* (2013.01); *G06T 2207/20076* (2013.01); *G06T 2207/30168* (2013.01)

(56) References Cited

U.S. PATENT DOCUMENTS

| | | | |
|---|---|---|---|
| 10,417,766 | B2 | 9/2019 | Lim et al. |
| 10,448,014 | B2 | 10/2019 | Possos et al. |
| 10,771,807 | B1 | 9/2020 | Ulaganathan et al. |
| 2007/0071103 | A1 | 3/2007 | Bi et al. |
| 2018/0075622 | A1* | 3/2018 | Tuffreau ............... G06T 9/001 |
| 2018/0114082 | A1 | 4/2018 | Choi et al. |
| 2018/0366055 | A1 | 12/2018 | Yoon et al. |
| 2019/0206070 | A1 | 7/2019 | Nash et al. |
| 2020/0145649 | A1 | 5/2020 | Kim et al. |
| 2020/0349673 | A1 | 11/2020 | Yoo et al. |

FOREIGN PATENT DOCUMENTS

| | | |
|---|---|---|
| KR | 10-1957944 B1 | 3/2019 |
| KR | 10-2401851 A | 5/2022 |

OTHER PUBLICATIONS

Shao-Yuan Lo et al., "Exploring Semantic Segmentation on the DCT Representation", MMAsia, Proceedings of the ACM Multimedia Asia, ACM, DOI: 10.1145/3338533.3366557, Dec. 2019, 8 pages total.

Communication dated May 13, 2022 issued by the International Searching Authority in counterpart Application No. PCT/KR2022/002064 (PCT/ISA/220, PCT/ISA/210, and PCT/ISA/237).

Sebastian Bosse et al: "Deep Neural Networks for No-Reference and Full-Reference Image Quality Assessment", arxiv.org, Cornell University Library, 201 Online Library Cornell University Ithaca, NY, 14853, Dec. 6, 2016, arXiv:1612.01697v1 [cs.CV].

Andrii Rubel et al: "Improved Noisy Image Quality Assessment Using Multilayer Neural Networks", 2019 IEEE 2nd Ukraine Conference on Electrical and Computer Engineering (UKRCON), IEEE, Jul. 2, 2019, pp. 1046-1051, XP033639925.

European Extended Search Report issued Jun. 13, 2024 by the European Patent Office for EP Patent Application No. 22763484.7.

\* cited by examiner

IMAGE PROCESSING APPARATUS AND OPERATING METHOD OF THE SAME

CROSS-REFERENCE TO RELATED APPLICATION

The present application is a Continuation application of International Application No. PCT/KR2022/002064, filed on Feb. 11, 2022, which claims priority from Korean Patent Application No. 10-2021-0029088, filed on Mar. 4, 2021, and Korean Patent Application No. 10-2021-0093137, filed on Jul. 15, 2021, the entire contents of which are incorporated herein by reference.

TECHNICAL FIELD

The disclosure relates to an image processing apparatus for obtaining quality information of an image by using a neural network and an operating method of the same.

BACKGROUND

As data traffic increases exponentially along with the development of computer technology, artificial intelligence has become an important trend for driving future innovation. Artificial intelligence is a method that mimics human thinking, and is applicable to virtually all industries. Examples of representative technologies of artificial intelligence include pattern recognition, machine learning, expert systems, neural networks, and natural language processing.

A neural network models represent the characteristics of biological nerve cells of humans by mathematical expressions, and uses an algorithm that mimics a human's learning ability. Through this algorithm, the neural network may generate a mapping between input data and output data, and the ability to generate this mapping can be expressed as the learning ability of the neural network. In addition, the neural network has a generalization ability to generate correct output data with respect to input data that has not been used for learning, based on a learning result.

When inferring quality information of a compressed image by using a deep neural network (e.g., a convolutional neural network (CNN) which has deep layers), for accurate inference, there is a need to distinguish, in the compressed image, a region of an image with high quality from a region of an image with low quality. For example, in the case of a flat region (e.g., low-frequency region), reduction in quality according to the compression ratio is not significant, but in the case of a texture region (e.g., high-frequency region), reduction in quality may be substantial due to the compression ratio. Accordingly, the texture region includes quality information with higher reliability than the flat region, and thus, there is a need to infer quality information of a compressed image by applying a different weight to each of the texture region and the flat region.

Technical Solution

According to various embodiments, an image processing apparatus for estimating image quality information of an image by applying weights to respective regions included in the image according to frequency characteristics by using a convolutional neural network, and an operating method thereof may be provided.

Advantageous Effects

An image processing apparatus according to an embodiment of the disclosure may estimate quality information of an image by applying weights to regions of the image according to reliability of quality information of each of the regions included in the image, thereby obtaining quality information with higher accuracy.

BRIEF DESCRIPTION OF THE DRAWINGS

The above and other features, aspects and advantages of certain embodiments of the disclosure will be more apparent from the following description taken in conjunction with the accompanying drawings.

SUMMARY

Figure 1:
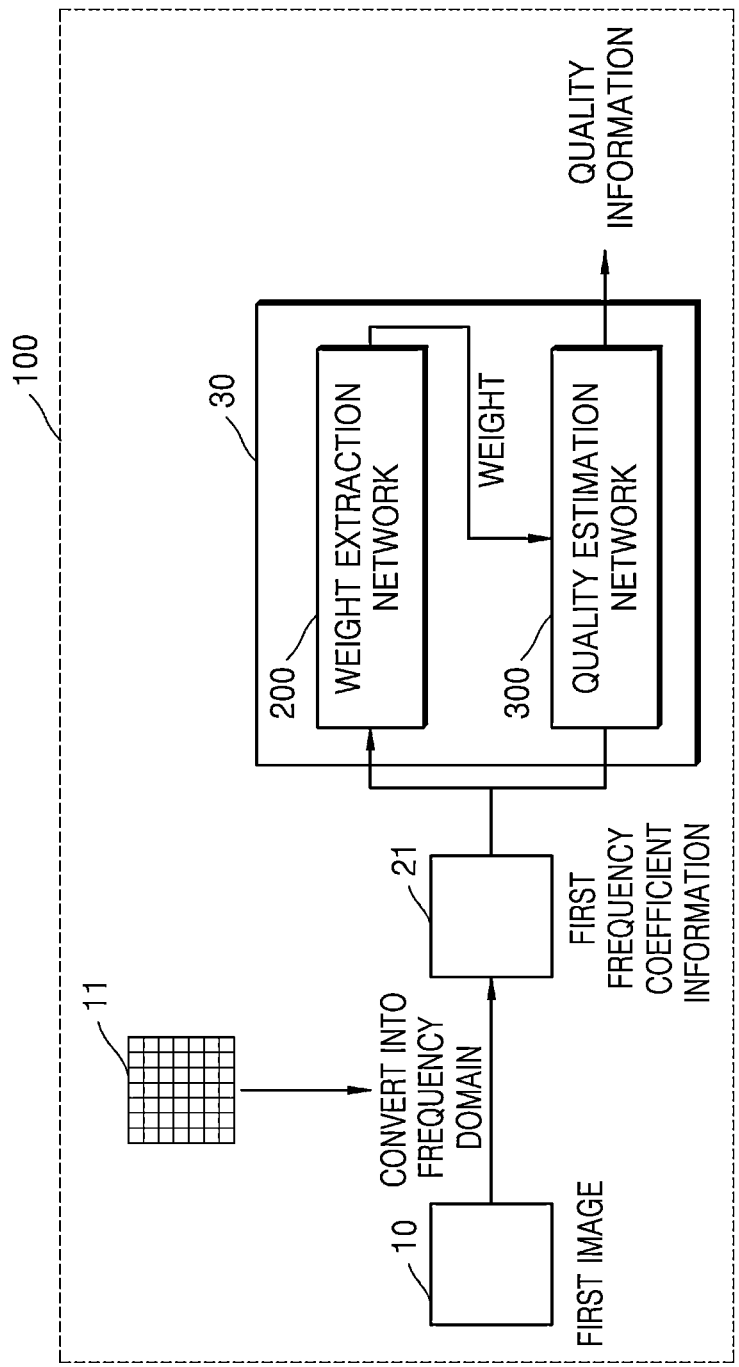
FIG. 1 is a view illustrating an image processing operation, performed by an image processing apparatus by using an image processing network, according to an embodiment of the disclosure.

Additional aspects will be set forth in part in the description which follows, and in part, will be apparent from the description, or may be learned by practice of the presented embodiments.

According to an embodiment, there is provided an image processing apparatus including: a memory storing one or more instructions; and a processor configured to execute the one or more instructions stored in the memory. The processor is configured to: obtain first frequency coefficient information by converting a first image into a frequency domain in units of blocks having a preset size; obtain correlation information indicating a correlation between at least one block of the first frequency coefficient information and a first kernel; generate a weight corresponding to the first frequency coefficient information based on the correlation information; generate second frequency coefficient information by rearranging coefficients included in the first frequency coefficient information, wherein one or more of the coefficients having a same frequency is arranged into a same group; and obtain quality information of the first image based on the weight and the second frequency coefficient information.

The weight indicates reliability of quality information indicated by the at least one block.

The first image includes an image having a YCbCr color space, and the processor is further configured to obtain the first image by performing color space conversion on an image having an RGB color space.

The first kernel has the preset size, and the processor is further configured to perform elementwise multiplication operation between the first frequency coefficient information and the first kernel in the units of the blocks and obtain the coefficient information in the units of the blocks by summing up resultant values obtained by performing the elementwise multiplication operation.

The first kernel includes M kernels having the preset size, wherein the M is an integer greater than or equal to 1, wherein the processor is further configured to obtain the correlation information by performing elementwise multiplication operation between the first frequency coefficient information and each of the M kernels in the units of the blocks, and wherein a number of channels of the correlation information is the M.

The processor is further configured to obtain the correlation information by performing first convolution operation between the first frequency coefficient information and the first kernel.

The processor is further configured to obtain first feature information by performing second convolution operation between the correlation information and a second kernel, and generate the weight based on the first feature information.

The processor is further configured to: obtain the second feature information by performing third convolution operation between the second frequency coefficient information and a third kernel; generate third feature information by applying the weight to the second feature information; and obtain the quality information of the first image based on the third feature information.

The processor is further configured to: convert the third feature information into a one-dimensional vector; and obtain the quality information by using the one-dimensional vector and a linear classification model.

The quality information includes a quality factor of the first image, wherein the linear classification model includes a model for receiving the one-dimensional vector and outputting probability values of a plurality of quality factors, and the processor is further configured to obtain a quality factor having a largest probability value among the plurality of quality factors as the quality information.

The processor is further configured to: convert the third feature information into a one-dimensional feature vector by performing pooling on the third feature information; and obtain a quality factor having a most similar feature vector to the one-dimensional feature vector among a plurality of quality factors as the quality information, based on similarities between the one-dimensional feature vector and feature vectors respectively corresponding to the plurality of quality factors.

According to an embodiment, there is provided an operating method of an image processing apparatus. The operating method includes: obtaining first frequency coefficient information by converting a first image into a frequency domain in units of blocks having a preset size; obtaining correlation information indicating a correlation between at least one block of the first frequency coefficient information and a first kernel; generating a weight corresponding to the first frequency coefficient information based on the correlation information; generating second frequency coefficient information by rearranging coefficients included in the first frequency coefficient information, wherein one or more of the coefficients having a same frequency is arranged into a same group; and obtaining quality information of the first image based on the weight and the second frequency coefficient information.

The weight indicates reliability of quality information indicated by the at least one block.

The first image includes an image having a YCbCr color space, and the operating method further includes obtaining the first image by performing color space conversion on an image having an RGB color space.

The first kernel has the preset size, and the obtaining the correlation information includes performing elementwise multiplication operation between the first frequency coefficient information and the first kernel in the units of the blocks and obtaining the coefficient information in the units of the blocks by summing up resultant values obtained by performing the elementwise multiplication operation.

The first kernel includes M kernels having the preset size, wherein the M is an integer greater than or equal to 1, wherein the obtaining the correlation information includes obtaining the correlation information by performing elementwise multiplication operation between the first frequency coefficient information and each of the M kernels in the units of the blocks, and wherein a number of channels of the correlation information is the M.

The obtaining the correlation information includes obtaining the correlation information by performing first convolution operation between the first frequency coefficient information and the first kernel.

The generating the weight includes: obtaining first feature information by performing second convolution operation between the correlation information and a second kernel; and generating the weight based on the first feature information.

The obtaining the quality information includes: obtaining second feature information by performing third convolution operation between the second frequency coefficient information and a third kernel; generating third feature information by applying the weight to the second feature information; and obtaining the quality information of the first image based on the third feature information.

The obtaining the quality information based on the third feature information includes: converting the third feature information into a one-dimensional vector; and obtaining the quality information by using the one-dimensional vector and a linear classification model.

The quality information includes a quality factor of the first image, wherein the linear classification model includes a model for receiving the one-dimensional vector and outputting probability values of a plurality of quality factors, and wherein the obtaining the quality information further includes obtaining a quality factor having a largest probability value among the plurality of quality factors as the quality information.

The obtaining the quality information based on the third feature information includes: converting the third feature information into a one-dimensional feature vector by performing pooling on the third feature information; and obtaining a quality factor having a most similar feature vector to the one-dimensional feature vector among a plurality of quality factors as the quality information, based on similarities between the one-dimensional feature vector and feature vectors respectively corresponding to the plurality of quality factors.

According an embodiment, there is provided a non-transitory computer-readable recording medium having stored therein a program including instructions causing a processor to execute the operating method described above.

DETAILED DESCRIPTION

Throughout the disclosure, the expression "at least one of a, b or c" indicates only a, only b, only c, both a and b, both a and c, both b and c, all of a, b, and c, or variations thereof.

Hereinafter, the terms used in the present disclosure will be briefly described, and then the disclosure will be described in detail.

The terms used in this disclosure are those terms currently widely used in the art in consideration of functions in regard to the disclosure, but the terms may vary according to the intention of those of ordinary skill in the art, precedents, or emergence of new technology in the art. Also, specified terms may be selected by the applicant, and in this case, the meaning thereof will be described in the detailed description of the disclosure. Thus, the terms used in the disclosure should be understood based on the meaning of the terms and the overall context of the disclosure.

Throughout the disclosure, when a part may "include" a certain constituent element, unless specified otherwise, it may not be construed to exclude another constituent element, but may be construed to further include other constituent elements. The terms such as "unit", "module" described in the disclosure or the like may refer to units that perform at least one function or operation, and the units may be implemented as hardware or software or as a combination of hardware and software.

Hereinafter, embodiments of the disclosure will be described more fully with reference to the accompanying drawings, in which the embodiments of the disclosure are shown such that one of ordinary skill in the art may practice the embodiments of the disclosure. This disclosure may, however, be embodied in many different forms and should not be construed as limited to the embodiments of the disclosure set forth herein. Also, elements not related to description are omitted for clear description of the disclosure, and like reference numerals in the drawings denote like elements throughout the disclosure.

FIG. 1 is a view illustrating an operation, performed by an image processing apparatus, of obtaining quality information of an image by using an image processing network, according to an embodiment of the disclosure.

Referring to FIG. 1, an image processing apparatus 100 according to an embodiment of the disclosure may obtain first frequency coefficient information 21 by converting a first image 10 into a frequency domain. The first image 10 may be an image having YCbCr color space, and may be an image generated by performing color space conversion on an image having a RGB color space.

In addition, the image processing apparatus 100 may convert the first image 10 into a frequency domain in units of blocks having a preset size (for example, N×N, where N is an integer greater than or equal to 1). For example, as illustrated in FIG. 1, the image processing apparatus 100 may obtain the first frequency coefficient information 21 by performing discrete cosine transformation (DCT) by using a DCT basis function 11 having a preset size. However, the disclosure is not limited thereto. The first frequency coefficient information 21 may be divided into a plurality of blocks, and coefficient information at the same position in each of the plurality of blocks may be coefficient information corresponding to the same frequency.

The first frequency coefficient information 21 may be input to an image processing network 30. The image processing network 30 according to an embodiment of the disclosure may be a network that receives the first frequency coefficient information 21 and processes the first frequency coefficient information 21 to output quality information of the first image 10.

The image processing network 30 according to an embodiment of the disclosure may include a weight extraction network 200 and a quality estimation network 300.

The weight extraction network 200 may generate a weight indicating reliability of quality information of each of the plurality of blocks included in the first frequency coefficient information 21.

For example, when the first image 10 is a compressed image, according to characteristics of regions included in the first image 10 (for example, frequency characteristics), reliability of quality information of the regions may vary. In a compressed image, the higher the compression rate (compression degree), the quality of a flat region including a large number of low-frequency components is not significantly reduced, but the quality of a textured region including a large number of high-frequency components is significantly reduced. Accordingly, as the quality of a flat region does not vary greatly according to the degree of compression, the reliability of the quality information of the flat region is relatively high. On the other hand, the quality of a texture region varies greatly according to the degree of compression, and thus, the reliability of the quality information of the texture region is relatively low.

Accordingly, by obtaining quality information of the first image 10 by distinguishing a flat region and a texture region from each other in the first image 10 and assigning a relatively small weight to the flat region and a relatively large weight to the text region, accuracy of obtained quality information may be increased as compared to a case where quality information is obtained by applying the same weight to both the flat region and the texture region.

Accordingly, the weight extraction network 200 may determine a weight indicating a reliability of quality information of each of regions included in the first image 10 based on the first frequency coefficient information 21 corresponding to the first image 10.

In addition, the quality estimation network 300 according to an embodiment of the disclosure may obtain quality information of the first image 10 based on the input first frequency coefficient information 21 and the weight generated by the weight extraction network 200. The quality information is a value indicating the quality of the first image 10 and may include a quality factor, but is not limited thereto. The quality information of the first image 10 according to an embodiment of the disclosure may be used as information for using or processing the first image 10, such as for reconstructing the first image 10.

Figure 2:
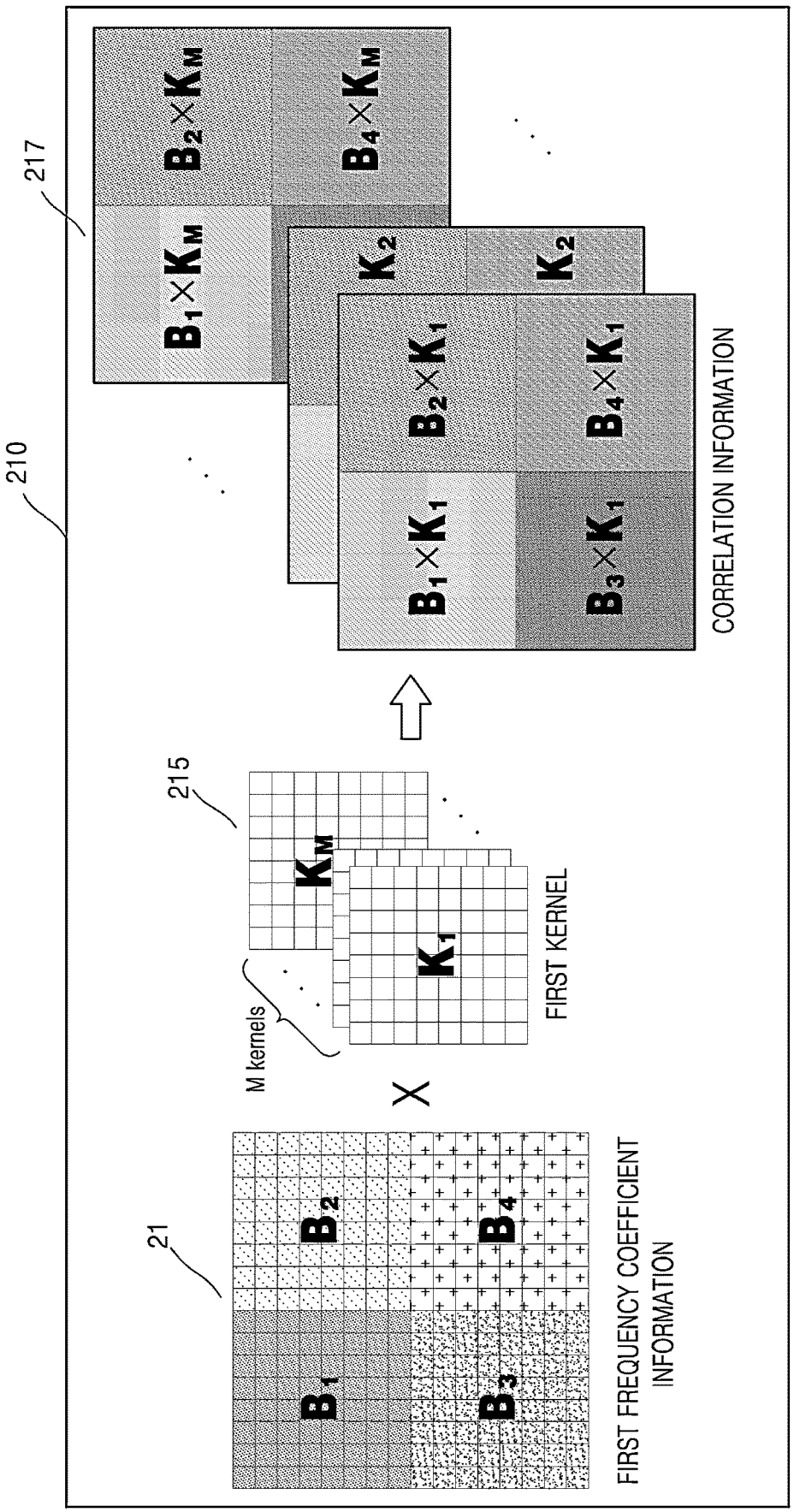
FIGS. 2 and 3 are reference diagrams for describing an operation of a weight extraction network according to an embodiment of the disclosure.
Figure 3:
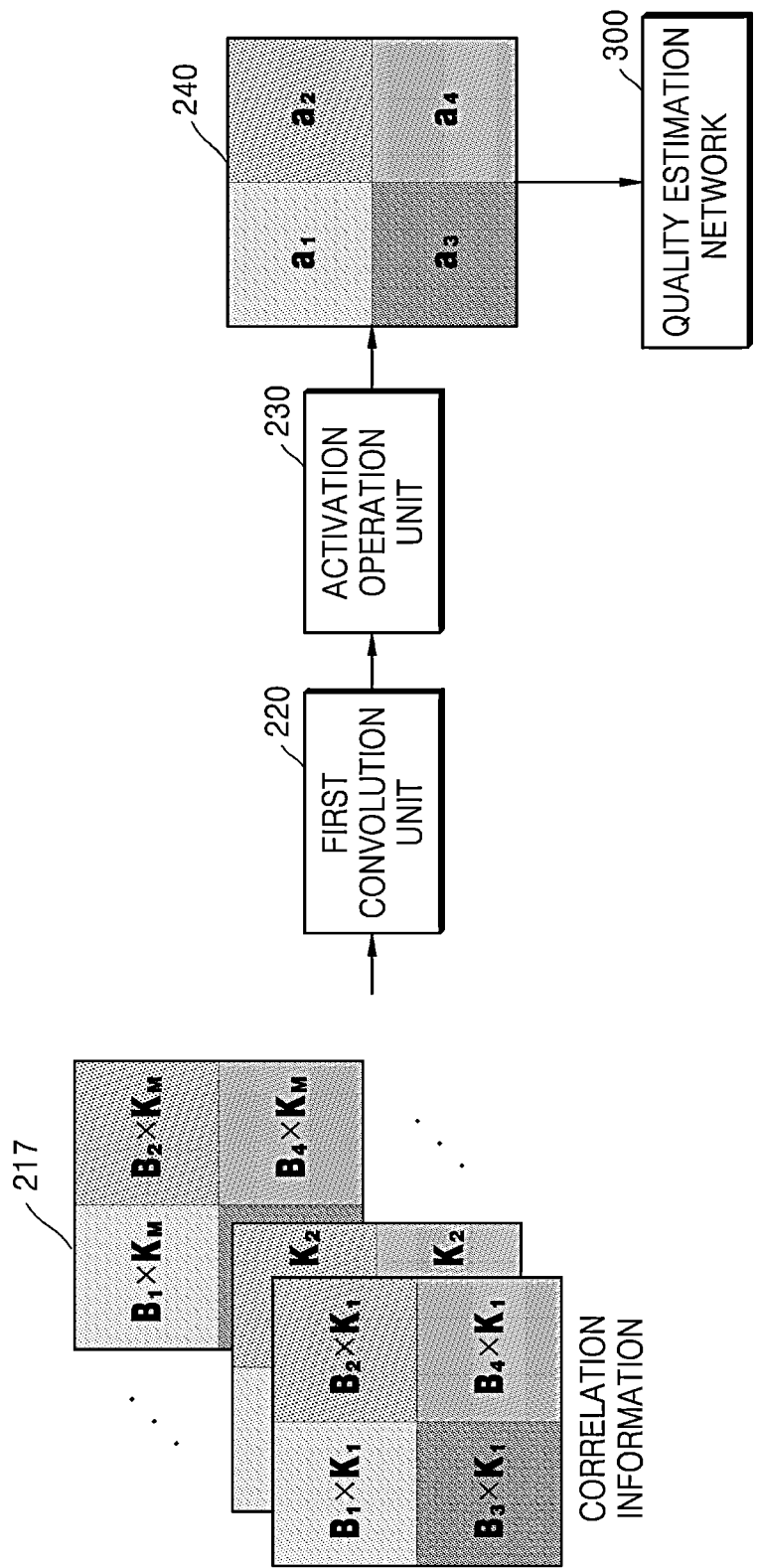

FIGS. 2 and 3 are reference diagrams for describing an operation of a weight extraction network according to an embodiment of the disclosure.

The weight extraction network 200 according to an embodiment of the disclosure may include a first operation unit 210, a first convolution unit 220, and an activation operation unit 230.

Referring to FIG. 2, the first operation unit 210 may obtain correlation information 217 by performing an operation between the first frequency coefficient information 21 and a first kernel 215.

The first frequency coefficient information 21 according to an embodiment of the disclosure may be divided into a plurality of blocks having a preset size (for example, N×N). In FIG. 2, for convenience of description, the first frequency coefficient information 21 divided into four blocks (a first block B1, a second block B2, a third block B3, and a fourth block B4) will be described as an example. However, the disclosure is not limited thereto.

The first operation unit 210 according to an embodiment of the disclosure may obtain correlation information 217 indicating a correlation between each of the blocks and the first kernel 215. In this case, the first kernel 215 may include M kernels $K_1, K_2, \ldots, K_M$ having a preset size (for example, N×N), where M is an integer greater than or equal to 1. The first operation unit 210 may obtain the correlation information 217 by performing an operation between the first frequency coefficient information 21 and each of the M kernels 215 in units of blocks. The operation performed here may be expressed by the following Equation (1).

$$B_n \times K_m = \sum_{j=1}^{N} \sum_{i=1}^{N} b_n^{i,j} k_m^{i,j} \quad \text{[Equation 1]}$$

In Equation 1, Bn represents each of the blocks included in the first frequency coefficient information 21, and $K_m$ represents each of the kernels included in the first kernel 215. Also, $b_n^{i,j}$ denotes a value located in an i-th row and a j-th column in block Bn, and $k_m^{i,j}$ denotes a value located in an i-th row and a j-th column in the kernel $K_m$.

For example, the first operation unit 210 may perform elementwise multiplication on each element of the first block $B_1$ and the M kernels 215. As shown in Equation 1, the elementwise multiplication operation is an operation of multiplying values at the same positions. For example, the first operation unit 210 may obtain correlation information $(B_1 \times K_1, B_1 \times K_2, \ldots, B_1 \times K_M)$ corresponding to the first block $B_1$ by summing up resultant values obtained by performing the elementwise multiplication operation. Also, correlation information may be obtained for each of the second to fourth blocks $B_2$, $B_3$, and $B_4$ by using the same method used with respect to the first block $B_1$.

The correlation information 217 according to an embodiment of the disclosure may be input to the first convolution unit 220.

Referring to FIG. 3, the first convolution unit 220 may include one or more convolutional layers. For example, when the first convolution unit 220 includes a plurality of convolutional layers, the plurality of convolutional layers may be consecutively positioned. For example, each of the plurality of convolutional layers may have a structure in which values output from a previous layer are received by a current layer, a convolution operation is performed in the current layer to obtain result values, and the obtained result values are output to a next layer.

In the embodiment of the present disclosure, for convenience of description, the first convolution unit 220 including one convolutional layer is described, but the disclosure is not limited thereto.

The first convolution unit 220 according to an embodiment of the disclosure may extract first feature information by performing a convolution operation between the correlation information 217 obtained by the first operation unit 210 and a second kernel included in the first convolution unit 220. A method of extracting the first feature information by performing a convolution operation will be described in detail with reference to FIGS. 4 and 5.

Figure 4:
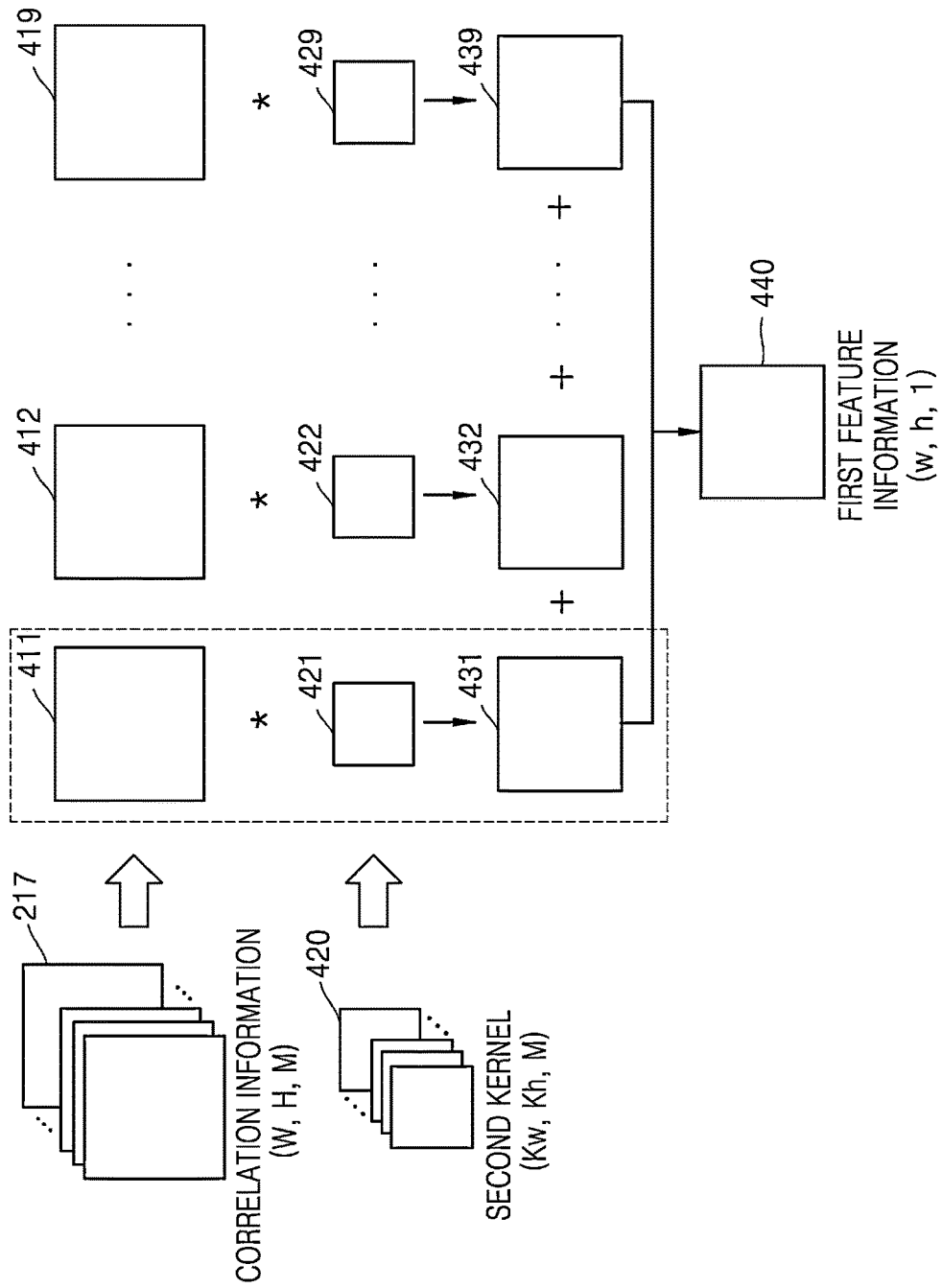
FIGS. 4 and 5 are reference diagrams for describing a convolution operation performed by a first convolution unit according to an embodiment of the disclosure.
Figure 5:
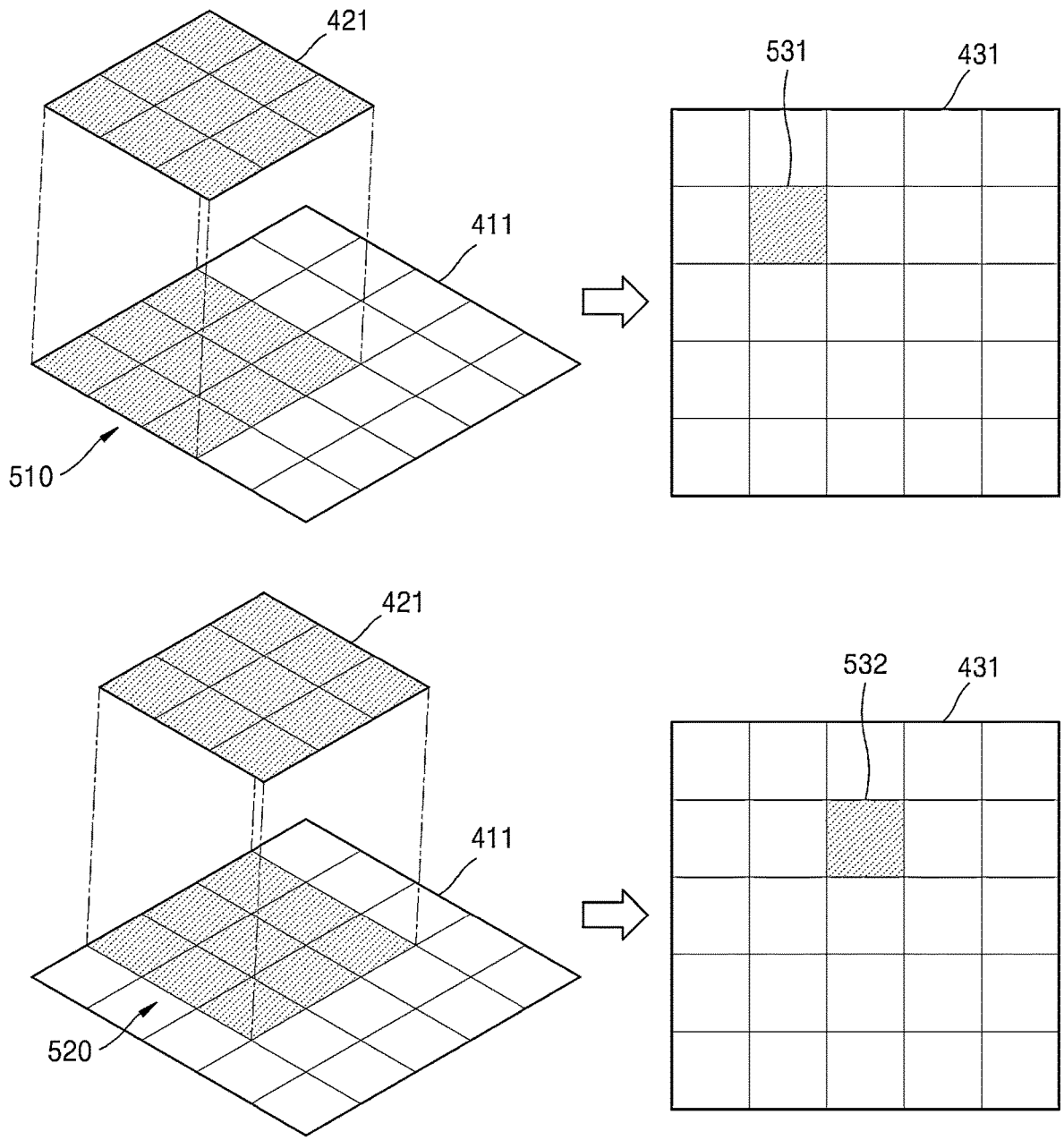

FIGS. 4 and 5 are reference diagrams for describing a convolution operation performed by a first convolution unit according to an embodiment of the disclosure.

FIG. 4 is a diagram illustrating the correlation information 217 input to the first convolution unit 220 according to an embodiment of the disclosure. The first convolution unit 220 may perform convolution using the correlation information 217 and a second kernel 420 included in the first convolution unit 220 to output first feature information 440.

Referring to FIG. 4, a size of the correlation information 217 input to the first convolution unit 220 according to the embodiment of the disclosure may be W×H, and the number of channels may be M. In addition, the first convolution unit 220 may include the second kernel 420, and the second kernel 420 may have a size of Kw×Kh, and the number of channels may be M. The first convolution unit 220 may extract the first feature information 440 by performing convolution operation between the correlation information 217 and the second kernel 420.

For example, as illustrated in FIG. 4, the correlation information 217 may include M channel images 411, 412, . . . , 419, and the second kernel 420 may include M sub-kernels 421, 422, . . . , 429.

The first convolution unit 220 may perform a convolution operation between a first channel image 411 and a first sub-kernel 421 to extract first sub-feature information 431, and perform a convolution operation between a second channel image 412 and a second sub-kernel 422 to extract second sub-feature information 432. In addition, M-th sub-feature information 439 may be extracted by performing a convolution operation between an M-th channel image 419 and an M-th sub-kernel 429. A method of extracting sub-feature information of each channel by performing a convolution operation between the channel images 411, 412, . . . , 419 and the sub-kernels 421, 422, . . . , 429 for each channel will be described in detail with reference to FIG. 5.

FIG. 5 illustrates a process in which the first sub-feature information 431 is generated through a convolution operation between the first channel image 411 and the first sub-kernel 421 of FIG. 4.

In FIG. 5, for convenience of description, it is assumed that the first channel image 411 has a size of 5×5 and the first sub-kernel 421 has a size of 3×3.

Referring to FIG. 5, a process of extracting the first sub-feature information 431 by performing a convolution operation by applying the first sub-kernel 421 from an upper left end to a lower right end of the first channel image 411 is illustrated. For example, the first sub-kernel 421 may be applied to pixels included in an upper left 3×3 region 510 of the first channel image 411 to perform element-wise multiplication and summation operations. That is, by multiplying pixel values included in the upper left 3×3 region 510 by parameter values included in the first sub-kernel 421 and summing up the results thereof, a pixel value 531 mapped to the upper left 3×3 region 510 may be generated in the first sub-feature information 431.

Thereafter, the first sub-kernel 421 may be moved to the next position with respect to the first channel image 411. For example, by multiplying pixel values included in a 3×3 region 520 moved by one pixel to the right from the upper left 3×3 region 510 of the first channel image 411 by parameter values included in the first sub-kernel 421 and summing up the results thereof, another pixel value 532 mapped to the 3×3 region 520 may be generated in the first sub-feature information 431. In the same manner, while sliding the first sub-kernel 421 from left to right and from top to bottom in the first channel image 411 by one pixel at a time, by multiplying parameter values included in the first sub-kernel 421 by pixel values of the first channel image 411 and summing up results thereof, pixel values included in the first sub-feature information 431 may be generated. Data subject to a convolution operation may be sampled while moving by one pixel at a time, or may also be sampled by the number of two or more pixels. A size of an interval between pixels sampled in a convolution process is referred to as a stride, and a size of the output first sub-feature information 431 may be determined according to a size of the stride.

Alternatively, padding may be performed on the first channel image 411. Padding refers to increasing a size of the first channel image 411 by adding a certain value (e.g., '0') to an edge of the first channel image 411 to prevent reduction in the size of the output first sub-feature information 431.

Referring back to FIG. 4, the first convolution unit 220 may obtain the first feature information 440 by performing elementwise summation of the first to Mth sub-feature information 431, 432, . . . , 439. The elementwise summation is an operation of adding up values at the same positions when summing the first to Mth sub-feature information 431, 432, . . . , 439.

Referring back to FIG. 3, the activation operation unit 230 may generate a weight 240 corresponding to each block by performing an activation function operation on first feature information. The activation function operation is giving a non-linear feature to first feature information, and an activation function may include a sigmoid function, a Tanh function, a Rectified Linear Unit (ReLU) function, a leaky ReLu function, etc., but is not limited thereto.

The weight 240 corresponding to each block may include a first weight $a_1$ corresponding to the first block $B_1$, a second weight $a_2$ corresponding to the second block $B_2$, a third weight $a_3$ corresponding to the third block $B_3$, and a fourth weight $a_4$ corresponding to the fourth block $B_4$. In addition, the weight 240 corresponding to each of the blocks may be a value greater than or equal to 0 and less than 1, and may be input to the quality estimation network 300.

Figure 6:
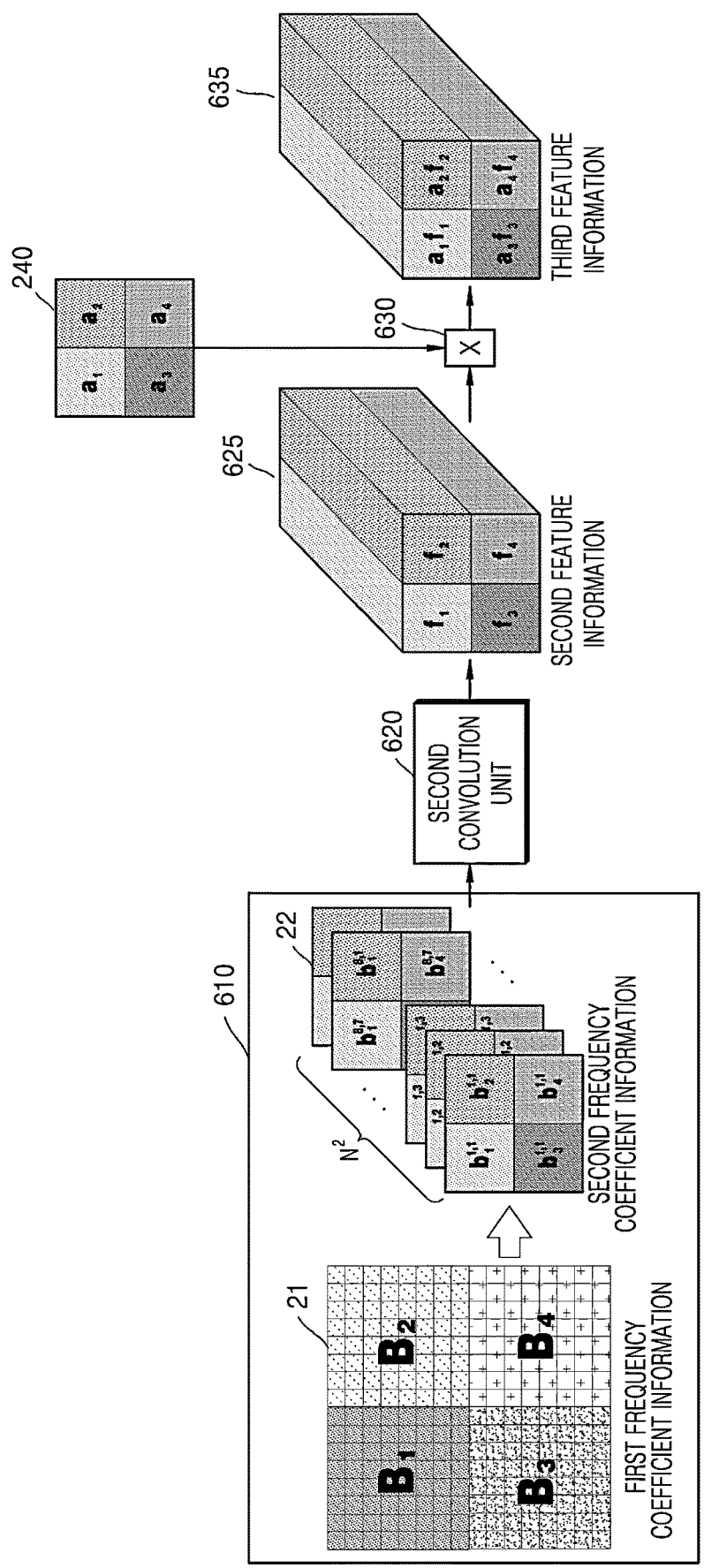
FIGS. 6 and 7 are reference diagrams for describing an operation of a quality estimation network according to an embodiment of the disclosure.
Figure 7:
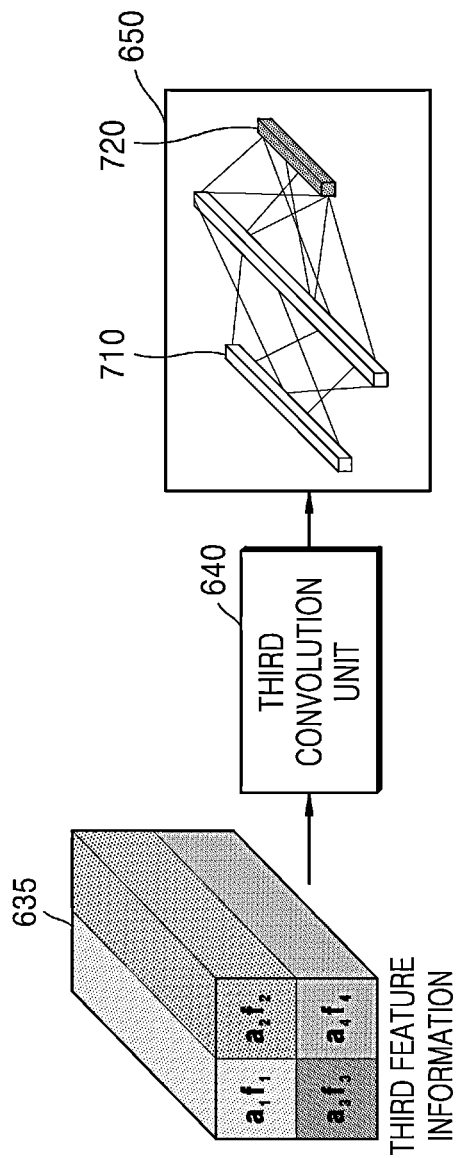

FIGS. 6 and 7 are reference diagrams for describing an operation of a quality estimation network according to an embodiment of the disclosure.

The quality estimation network 300 according to an embodiment of the disclosure may include a rearrangement unit 610, a second convolution unit 620, a weight applying unit 630, a third convolution unit 640, and a quality operation unit 650.

Referring to FIG. 6, the rearrangement unit 610 according to an embodiment of the disclosure may rearrange coefficient information included in the first frequency coefficient information 21 to obtain second frequency coefficient information 22. The rearrangement unit 610 may obtain the second frequency coefficient information 22 by rearranging coefficient information corresponding to the same frequency in each of the blocks included in the first frequency coefficient information 21, into the same groups (channels). The coefficient information at the same position in each of the blocks included in the first frequency coefficient information 21 is coefficient information corresponding to the same frequency, and thus, the rearrangement unit 610 may rearrange the coefficient information at the same position in each of the blocks into the same groups (channels). For example, in each of first to fourth blocks, the rearrangement unit 610 may determine values ($b_1^{1,1}$, $b_2^{1,1}$, $b_3^{1,1}$, $b_4^{1,1}$) located at a first row (i=1) and a first column (j=1) in each of the first to fourth blocks as a first channel of the second frequency coefficient information 22. Also, in each of the first to fourth blocks, the values $b_1^{1,2}$, $b_2^{1,2}$, $b_3^{1,2}$, $b_4^{1,2}$) located in the first row (i=1) and a second column (j=2) in each of the first to fourth blocks may be determined as a second channel of the second frequency coefficient information 22. The rearrangement unit 610 may rearrange values included in each of the first to fourth blocks $B_1$, $B_2$, $B_3$, and $B_4$ in the above-described method, and accordingly, the number of channels of the second frequency coefficient information 22 is determined based on the block size (N×N), and the second frequency coefficient information 22 includes $N^2$ channels.

The second frequency coefficient information 22 according to an embodiment of the disclosure may be input to the second convolution unit 620.

The second convolution unit 620 may obtain second feature information 625 based on the second frequency coefficient information 22. For example, the second convolution unit 620 may include one or more convolutional layers. When the second convolution unit 620 includes a plurality of convolutional layers, the plurality of convolutional layers may be consecutively positioned. A first convolutional layer among the plurality of convolutional layers may receive the second frequency coefficient information 22 to perform a convolution operation and execute an obtained resultant value. In addition, one of the plurality of convolutional layers, not including the first convolutional layer, may have a structure in which values output from a previous convolutional layer are received, a convolution operation is performed in a current layer to obtain result values, and the obtained result values are output to a next layer.

In the embodiment of the disclosure, for convenience of description, the second convolution unit 620 including one convolutional layer is described, but is not limited thereto.

The second convolution unit 620 may perform a convolution operation between the second frequency coefficient information 22 and a third kernel included in the second convolution unit 620 to extract the second feature information 625. The second feature information 625 includes feature information corresponding to each of the blocks.

The weight applying unit 630 may obtain third feature information 635 by applying the weight 240 of each of the blocks obtained from the weight extraction network 200, to the second feature information 625.

The weight applying unit 630 may obtain the third feature information 635 by multiplying the feature information corresponding to each of the blocks included in the second feature information 625 and the weight 240 corresponding to each of the blocks. For example, the weight applying unit 630 may obtain the third feature information 635 by multiplying the first weight $a_1$ by feature information f1 corresponding to the first block B1 included in the second feature information 625, by multiplying the second weight $a_2$ by feature information f2 corresponding to the second block B2 included in the second feature information 625, by multiplying the third weight $a_3$ by feature information f3 corresponding to the third block B3 included in the second feature information 625, and by multiplying the fourth weight $a_4$ by feature information f4 corresponding to the fourth block $B_2$ included in the second feature information 625. Although the one or more embodiments are described above as including the first to fourth blocks B1 to B4 and the first weights $a_1$ to $a_4$, the one or more embodiments are not limited thereto, and the number of blocks and weights may be variously configured.

Referring to FIG. 7, the third feature information 635 according to an embodiment of the disclosure may be input to the third convolution unit 640.

For example, the third convolution unit 640 according to an embodiment of the disclosure may include one or more convolutional layers. For example, when the third convolution unit 640 includes a plurality of convolutional layers, the plurality of convolutional layers may be consecutively positioned. Each of the plurality of convolutional layers may have a structure in which values output from a previous layer are received, a convolution operation is performed in a current layer to obtain result values, and the obtained result values are output to a next layer.

In the embodiment of the disclosure, for convenience of description, the third convolution unit 640 including one convolutional layer is described, but is not limited thereto.

Referring to FIG. 7, the third convolution unit 640 may extract fourth feature information by performing a convolution operation between the third feature information 635, to which a weight is applied, and a fourth kernel.

The fourth feature information may be input to the quality operation unit 650, and the quality operation unit 650 may convert the fourth feature information into a one-dimensional vector 710. For example, the quality operation unit 650 may convert the fourth feature information into the one-dimensional vector 710 through an operation of fully connecting values included in the fourth feature information one dimensionally, but the disclosure is not limited thereto.

The quality operation unit 650 may obtain quality information of the first image 10 by using a transformed vector and a linear classification model. For example, the linear classification model according to an embodiment of the disclosure may be a model that receives a vector and calculates respective probability values 720 of a plurality of quality factors, and may be expressed by Equation 2 below.

$$f(x, W, b) = Wx + b \quad \text{[Equation 2]}$$

In Equation 2, f denotes respective probability values of a plurality of quality factors, W denotes a weight matrix of the linear classification model, b denotes a bias vector of the linear classification model, and x denotes a vector input to the linear classification model. The quality operation unit 650 may obtain a quality factor corresponding to a largest value among the respective probability values of the plurality of quality factors as quality information of the first image 10.

Figure 8:
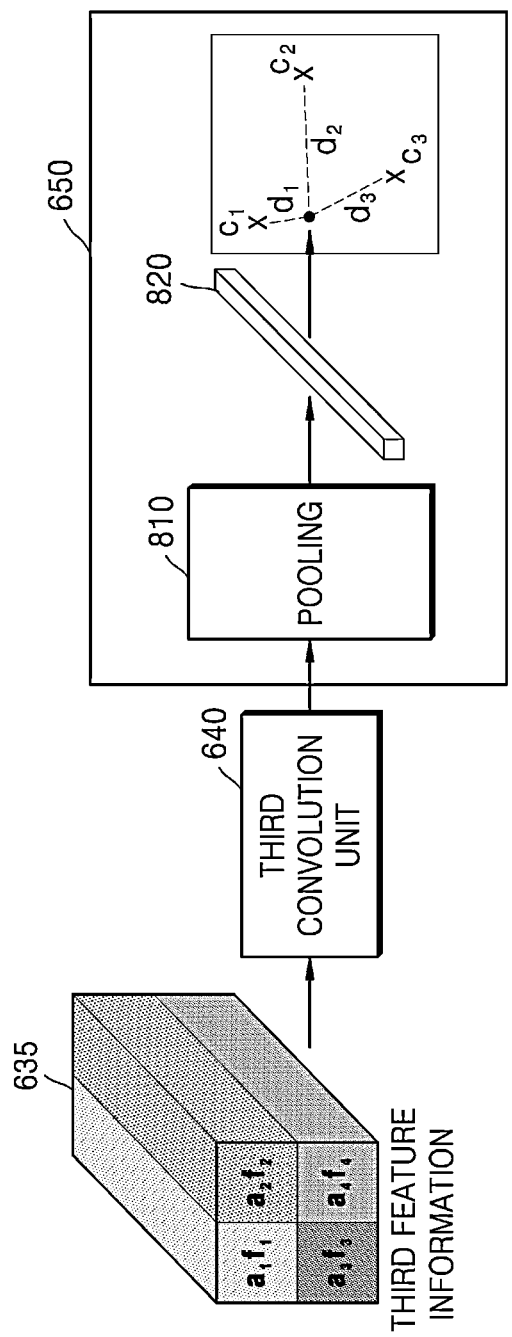
FIG. 8 illustrates an operation of a quality operation unit according to another embodiment of the disclosure.

FIG. 8 illustrates an operation of a quality operation unit according to another embodiment of the disclosure.

Referring to FIG. 8, the third convolution unit 640 may extract the fourth feature information by performing a convolution operation between the third feature information 635, to which a weight is applied, and the fourth kernel. The above operation has been described in detail with reference to FIG. 7, and thus, detailed descriptions thereof will be omitted.

The fourth feature information may be input to the quality operation unit 650, and the quality operation unit 650 may perform pooling 810 on the fourth feature information. The pooling 810 refers to generating one pixel representing a feature by summarizing a plurality of pixels from the fourth feature information. As a method of summarizing a plurality of pixels, a method of taking a maximum value (Max pooling) or a method of taking an average value (Average pooling) may be used. The method of taking one average value from one channel of feature information is called Global Average Pooling (GAP), and the quality operation unit 650 may generate a one-dimensional vector 820 by performing GAP.

The quality operation unit 650 may determine quality information of the first image 10 based on similarities between the generated one-dimensional vector 820 and feature vectors respectively corresponding to the quality factors. For example, the feature vectors respectively corresponding to the plurality of quality factors may be stored in advance. The feature vectors respectively corresponding to the plurality of quality factors may be extracted from a compressed image having each corresponding quality factor, but is not limited thereto.

The quality operation unit 650 may calculate distances $d_1$, $d_2$, and $d_3$ between a first feature vector $c_1$ corresponding to a first quality factor, a second feature vector $c_2$ corresponding to a second quality factor, and a third feature vector $c_3$ corresponding to a third quality factor and the one-dimensional vector 820 generated through the GAP, respectively. The quality operation unit 650 may determine, as the quality information of the first image 10, the first quality factor corresponding to the first feature vector $c_1$ having the distance d1 that is closest to the one-dimensional vector 820. However, the disclosure is not limited thereto.

Figure 9:
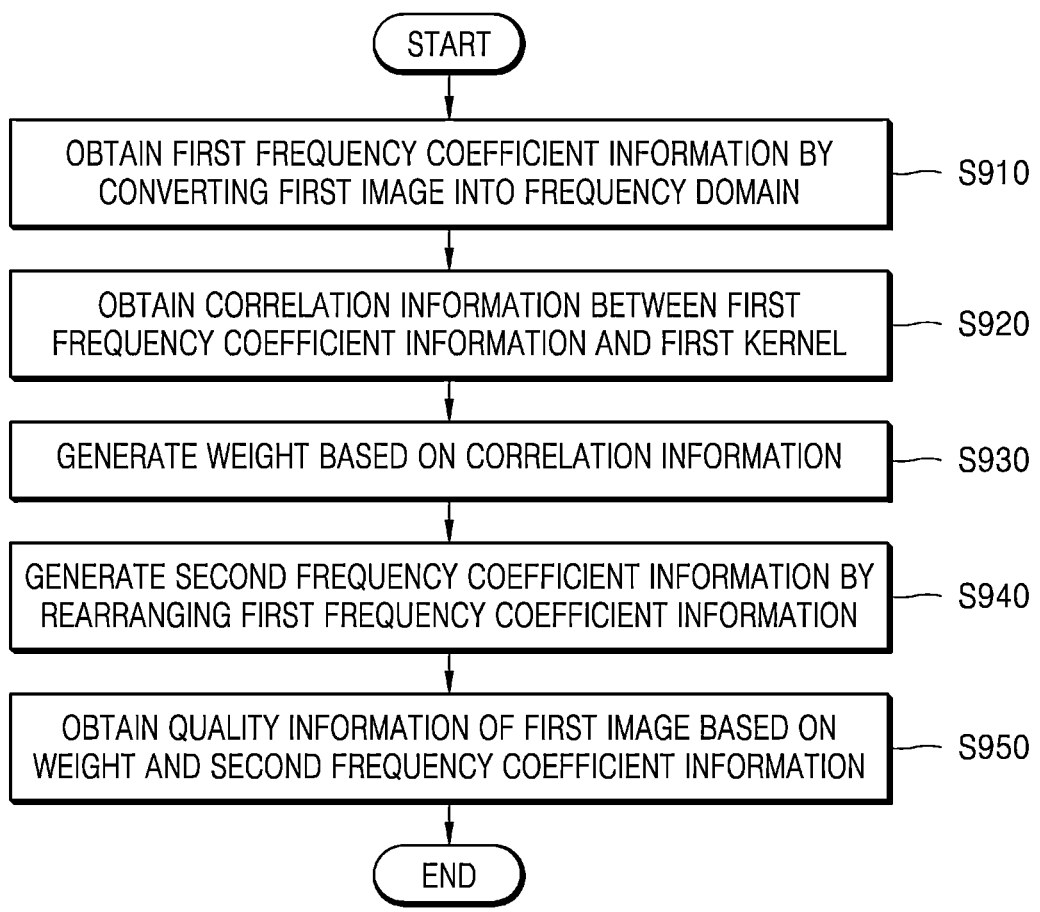
FIG. 9 is a flowchart of an operating method of an image processing apparatus, according to an embodiment of the disclosure.

FIG. 9 is a flowchart of an operating method of an image processing apparatus, according to an embodiment of the disclosure.

Referring to FIG. 9, the image processing apparatus 100 according to an embodiment of the disclosure may obtain first frequency coefficient information by converting a first image into a frequency domain in units of blocks having a preset size.

For example, the image processing apparatus 100 may obtain the first frequency coefficient information by performing DCT-based transformation by using a DCT basis function having a preset size. However, the disclosure is not limited thereto. The first frequency coefficient information may be divided into a plurality of blocks having a preset size N×N, and coefficient information at the same position in each of the plurality of blocks may be coefficient information corresponding to the same frequency.

The image processing apparatus 100 according to an embodiment of the disclosure may obtain correlation information between the first frequency coefficient information and a first kernel (S920).

The image processing apparatus 100 may obtain correlation information indicating a correlation between at least one block and a first kernel in units of blocks having a preset size of N×N, by performing an operation between at least one block corresponding to the first frequency coefficient information and the first kernel. For example, the image processing apparatus 100 may perform an elementwise multiplication operation between a first block among a plurality of blocks and the first kernel and obtain correlation information about the first block by summing up resultant values obtained by performing the elementwise multiplication operation, and may obtain correlation information about other blocks by using the same method used with respect to the first block.

Alternatively or additionally, the image processing apparatus 100 may obtain correlation information by performing a convolution operation between the first frequency coefficient information and the first kernel.

The image processing apparatus 100 according to an embodiment of the disclosure may generate a weight corresponding to each of the blocks based on the correlation information (S930).

For example, the image processing apparatus 100 may extract the first feature information through a convolution operation between the correlation information obtained in operation S920 and a second kernel. The method of extracting the first feature information is described in detail with reference to FIGS. 4 and 5, and thus, detailed descriptions thereof will be omitted.

The image processing apparatus 100 may generate a weight corresponding to each of the blocks by performing an activation function operation on the first feature information. In this case, the weight may be a value greater than or equal to 0 or more but less than 1, but is not limited thereto.

The image processing apparatus 100 according to an embodiment of the disclosure may generate second frequency coefficient information by rearranging the first frequency coefficient information (S940).

For example, the image processing apparatus 100 may generate the second frequency coefficient information by rearranging coefficients included in the first frequency coefficient information into the same groups (channels) among coefficients corresponding to the same frequency. Here, coefficient information at the same position in each of the plurality of blocks corresponding to the first frequency coefficient information is coefficient information corresponding to the same frequency, and thus, the image processing apparatus 100 may generate second frequency coefficient information by rearranging coefficient information at the same position in each of the plurality of blocks corresponding to the first frequency coefficient information, into the same groups (channels). Accordingly, the number of channels of the second frequency coefficient information is determined based on a block size (N×N), and includes $N^2$ channels.

The image processing apparatus 100 according to an embodiment of the disclosure may obtain quality information of the first image based on the weight generated in operation 930 (S930) and the second frequency coefficient information generated in operation 940 (S940) (S950).

The image processing apparatus 100 may extract second feature information by performing a convolution operation between the second frequency coefficient information and a third kernel. The image processing apparatus 100 may obtain third feature information by applying a weight to the second feature information. For example, the image processing apparatus 100 may obtain the third feature information by multiplying the feature information corresponding to each of the blocks included in the second feature information and a weight corresponding to each of the blocks.

The image processing apparatus 100 may extract fourth feature information by performing a convolution operation between the third feature information and the fourth kernel.

The image processing apparatus 100 may convert the fourth feature information into a one-dimensional vector. For example, the fourth feature information may be converted into a one-dimensional vector through an operation of one-dimensionally connecting values included in the fourth feature information, but is not limited thereto. The image processing apparatus 100 may obtain quality information of the first image by using a one-dimensional vector and a linear classification model for receiving the one-dimensional vector and calculating respective probability values of a plurality of quality factors. For example, the image processing apparatus 100 may determine a quality factor having a largest probability value among probability values output from the linear classification model, as the quality information of the first image.

Alternatively or additionally, the image processing apparatus 100 may generate a one-dimensional vector by performing pooling on the fourth feature information. The image processing apparatus 100 may determine, as the quality information of the first image, a quality factor corresponding to a most similar feature vector, based on similarity between the one-dimensional vector and feature vectors respectively corresponding to the plurality of quality factors.

Figure 10:
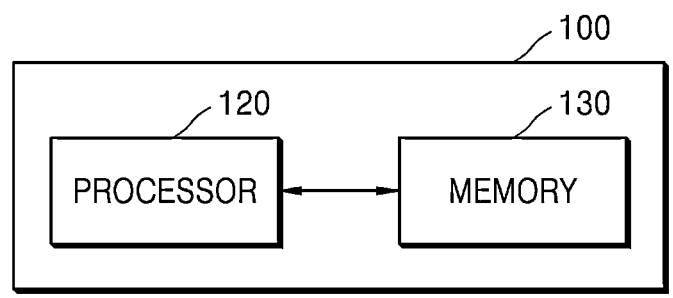
FIG. 10 is a block diagram illustrating an image processing apparatus according to an embodiment of the disclosure.

FIG. 10 is a block diagram illustrating an image processing apparatus according to an embodiment of the disclosure.

Referring to FIG. 10, the image processing apparatus 100 according to an embodiment of the disclosure may include a processor 120 and a memory 130.

The processor 120 according to an embodiment of the disclosure may control overall operations of the image processing apparatus 100. The processor 120 may include one or more processors. The processor 120 according to an embodiment of the disclosure may execute one or more programs stored in the memory 130.

The memory 130 according to an embodiment of the disclosure may store various data, programs, or applications for driving and controlling the image processing apparatus 100. A program stored in the memory 130 may include one or more instructions. A program (one or more instructions) or an application stored in the memory 130 may be executed by the processor 120.

The processor 120 according to an embodiment of the disclosure may include at least one of a central processing unit (CPU), a graphic processing unit (GPU), or a video processing unit (VPU). Alternatively or additionally, according to an embodiment of the disclosure, the processor 120 may be implemented in the form of a system on chip (SoC) in which at least one of a CPU, a GPU, or a VPU is integrated. The processor 120 may further include a Neural Processing Unit (NPU).

The processor 120 according to an embodiment of the disclosure may obtain quality information of an image by using the image processing network 30. For example, the processor 120 may perform at least one of operations of the first operation unit 210, the first convolution unit 220, the activation operation unit 230, the rearrangement unit 610, the second convolution unit 620, the weight applying unit 630, the third convolution unit 640, or the quality operation unit 650 illustrated in and described with reference to FIGS. 2 to 8.

The processor 120 may obtain first frequency coefficient information by converting the first image into a frequency domain in units of blocks having a preset size. For example, the processor 120 may obtain the first frequency coefficient information by performing DCT-based transformation by using a DCT basis function having a preset size. However, the disclosure is not limited thereto. The first frequency coefficient information may be divided into a plurality of blocks having a preset size N×N, and coefficient information at the same position in each of the plurality of blocks may be coefficient information corresponding to the same frequency.

The processor 120 may obtain correlation information between the first frequency coefficient information and the first kernel. The processor 120 may obtain correlation information indicating a correlation between at least one block and the first kernel in units of blocks having a preset size of N×N, by performing an operation between at least one block corresponding to the first frequency coefficient information and the first kernel. For example, the processor 120 may perform an elementwise multiplication operation between a first block among the plurality of blocks and the first kernel and obtain correlation information about the first block by summing up resultant values obtained by performing the elementwise multiplication operation, and may also obtain correlation information about other blocks by using the same method used with respect to the first block.

The image processing apparatus 100 may obtain correlation information by performing a convolution operation between the first frequency coefficient information and the first kernel. The method of obtaining correlation information is described in detail with reference to FIG. 2, and thus, detailed descriptions thereof will be omitted.

The processor 120 may generate a weight corresponding to each of the blocks based on the correlation information. For example, the processor 120 may extract first feature information through a convolution operation between the correlation information and the second kernel. The method of extracting the first feature information is described in detail with reference to FIGS. 4 and 5, and thus, detailed descriptions thereof will be omitted. The processor 120 may generate a weight corresponding to each of the blocks by performing an activation function operation on the first feature information. The weight may be a value of 0 or more but less than 1, but is not limited thereto.

The processor 120 may generate second frequency coefficient information by rearranging the first frequency coefficient information. For example, the processor 120 may generate the second frequency coefficient information by rearranging coefficients included in the first frequency coefficient information into the same groups (channels) among coefficients corresponding to the same frequency. Here, coefficient information at the same position in each of the plurality of blocks corresponding to the first frequency coefficient information is coefficient information corresponding to the same frequency, and thus, the processor 120 may generate second frequency coefficient information by rearranging coefficient information at the same position in each of the plurality of blocks corresponding to the first frequency coefficient information, into the same groups (channels). Accordingly, the number of channels of the second frequency coefficient information is determined based on the block size (N×N), and includes $N^2$ channels.

The processor 120 may obtain quality information about the first image based on a weight and the second frequency coefficient information.

For example, the processor 120 may extract second feature information by performing a convolution operation between the second frequency coefficient information and the third kernel. The processor 120 may obtain third feature information by applying a weight to the second feature information. For example, the processor 120 may obtain the third feature information by multiplying the feature information corresponding to each of the blocks included in the second feature information and a weight corresponding to each of the blocks.

The processor 120 may extract fourth feature information by performing a convolution operation between the third feature information and a fourth kernel.

The processor 120 may convert the fourth feature information into a one-dimensional vector. For example, the fourth feature information may be converted into a one-dimensional vector through an operation of one-dimensionally connecting values included in the fourth feature information, but is not limited thereto. The processor 120 may obtain quality information of the first image by using a one-dimensional vector and a linear classification model for receiving the one-dimensional vector and calculating respective probability values of a plurality of quality factors. For example, the processor 120 may determine a quality factor having a largest probability value among probability values output from the linear classification model, as the quality information of the first image.

Alternatively or additionally, the processor 120 may generate a one-dimensional vector by performing pooling on the fourth feature information. The processor 120 may determine a quality factor corresponding to a most similar feature vector, as the quality information of the first image, based on similarities between the one-dimensional vector and the feature vectors respectively corresponding to the plurality of quality factors.

At least one of the image processing network 30, the weight extraction network 200, or the quality estimation network 300 according to an embodiment of the disclosure may be a network trained by a server or an external device. The server or the external device may train at least one of the image processing network 30, the weight extraction network 200, or the quality estimation network 300 based on training data. For example, the server or the external device may train the image processing network 30 by using a plurality of data sets including frequency coefficient information obtained by converting an image into a frequency domain and quality information of the image.

The server or the external device may determine, through training, parameter values included in kernels used in each of the plurality of convolutional layers included in the image processing network 30. For example, the server or the external device may determine parameter values such that a difference (loss information) between the quality information generated by the image processing network 30 and quality information of an image included in the training data is minimized.

The image processing apparatus 100 according to an embodiment of the disclosure may receive the image processing network 30 that has been trained, from a server or an external device and store the received image processing network 30 in the memory 130. For example, the memory 130 may store a structure and parameter values of the image processing network 30 according to an embodiment of the disclosure, and by using the parameter values stored in the memory 130, the processor 120 may generate, from a first image according to an embodiment of the disclosure, a second image in which edge characteristics are preserved while noise is removed.

The block diagram of the image processing apparatus 100 illustrated in FIG. 10 is a block diagram for an embodiment of the disclosure. Each component of the block diagram may be integrated, added, or omitted according to the specifications of the image processing apparatus 100 that is actually implemented. That is, according to various embodiments, two or more components may be combined into a single component, or a single component may be divided into two or more components. In addition, functions performed by each block are for explaining embodiments of the disclosure, and specific operations or devices thereof do not limit the scope of the disclosure.

The operating method of the image processing apparatus according to the embodiments of the disclosure may be embodied as program commands executable by various computer means and may be recorded on a computer-readable recording medium. The computer-readable recording medium may include program commands, a data file, a data structure etc. alone or in combination. The program commands written to the computer-readable recording medium may be specifically designed and configured for the disclosure or may be well-known and available to one of ordinary skill in the art. Examples of the computer-readable recording medium include magnetic media (e.g., hard disks, floppy disks, magnetic tapes, etc.), optical media (e.g., CD-ROMs, or DVDs), magneto-optical media (e.g., floptical disks), and hardware devices specifically configured to store and execute program commands (e.g., ROM, RAM, flash memories, etc.). Examples of the program commands include, not only machine language codes made by a compiler, but also high-level language codes that can be executed by a computer by using an interpreter or the like.

Also, the image processing apparatus and the operating method of the image processing apparatus according to the disclosed embodiments may be included in a computer program product and provided in that form. Computer program products can be traded between sellers and buyers as commodities.

The computer program products may include an S/W program, a computer-readable storage medium in which the S/W program is stored. For example, the computer program product may include a product (e.g., a downloadable app) in the form of an S/W program distributed electronically through a device manufacturer or an electronic market (e.g., Google Play Store, App Store, etc.). For electronic distribution, at least a portion of an S/W program may be stored in a storage medium or may be temporarily generated. In this case, the storage medium may be a storage medium of a server of a manufacturer, a server of an electronic market, or a relay server temporarily storing a SW program.

In a system including a server and a client device, the computer program product may include a storage medium of the server or a storage medium of the client device. Alternatively or additionally, when there is a third device (e.g., a smartphone) that is connected to the server or the client device through communication, the computer program product may include a storage medium of the third device. Alternatively or additionally, the computer program product may include S/W program itself transmitted from the server to the client device or the third device, or transmitted from the third device to the client device.

In this case, one of the server, the client device, and the third device may execute a computer program product to perform the method according to the disclosed embodiments. Alternatively or additionally, two or more of the server, the client device, and the third device may execute a computer program product to implement the method according to the disclosed embodiments in a distributed manner.

For example, a server (e.g., a cloud server or an artificial intelligence server) may execute a computer program product stored in the server to control a client device communicatively connected with the server to perform the method according to the disclosed embodiments.

While one or more embodiments of the disclosure have been described with reference to the figures, the scope of the disclosure is not limited thereto, and it will be understood by those of ordinary skill in the art that various changes in form and details may be made therein without departing from the spirit and scope of the disclosure as defined by the following claims.

The invention claimed is:

1. An image processing apparatus comprising:
a memory storing one or more instructions; and
a processor configured to execute the one or more instructions stored in the memory to:
obtain first frequency coefficient information by converting a first image into a frequency domain in units of blocks having a preset size;
obtain correlation information indicating a correlation between at least one block of the first frequency coefficient information and a first kernel;
obtain first feature information by performing a convolution operation between the correlation information and a second kernel;
generate a weight corresponding to the first frequency coefficient information based on the first feature information, wherein the weight indicates reliability of quality information indicated by the at least one block;
generate second frequency coefficient information by rearranging coefficients included in the first frequency coefficient information, wherein one or more of the coefficients having a same frequency is arranged into a same group; and
obtain quality information of the first image based on the weight and the second frequency coefficient information.

2. The image processing apparatus of claim 1, wherein the first image comprises an image having a YCbCr color space, and
wherein the processor is further configured to obtain the first image by performing color space conversion on an image having an RGB color space.

3. The image processing apparatus of claim 1, wherein the first kernel has the preset size, and
wherein the processor is further configured to perform elementwise multiplication operation between the first frequency coefficient information and the first kernel in the units of the blocks and obtain the correlation information in the units of the blocks by summing up resultant values obtained by performing the elementwise multiplication operation.

4. The image processing apparatus of claim 1, wherein the first kernel comprises M kernels having the preset size, wherein the M is an integer greater than or equal to 1,
wherein the processor is further configured to obtain the correlation information by performing elementwise multiplication operation between the first frequency coefficient information and each of the M kernels in the units of the blocks, and
wherein a number of channels of the correlation information is the M.

5. The image processing apparatus of claim 1, wherein the processor is further configured to obtain the correlation information by performing a convolution operation between the first frequency coefficient information and the first kernel.

6. The image processing apparatus of claim 1, wherein the processor is further configured to:
obtain second feature information by performing a convolution operation between the second frequency coefficient information and a third kernel;
generate third feature information by applying the weight to the second feature information; and
obtain the quality information of the first image based on the third feature information.

7. The image processing apparatus of claim 6, wherein the processor is further configured to:
convert the third feature information into a one-dimensional vector; and
obtain the quality information by using the one-dimensional vector and a linear classification model.

8. The image processing apparatus of claim 7, wherein the quality information comprises a quality factor of the first image,
wherein the linear classification model comprises a model for receiving the one-dimensional vector and outputting probability values of a plurality of quality factors, and
wherein the processor is further configured to obtain a quality factor having a largest probability value among the plurality of quality factors as the quality information.

9. The image processing apparatus of claim 6, wherein the processor is further configured to:
- convert the third feature information into a one-dimensional feature vector by performing pooling on the third feature information; and
- obtain a quality factor having a most similar feature vector to the one-dimensional feature vector among a plurality of quality factors as the quality information, based on similarities between the one-dimensional feature vector and feature vectors respectively corresponding to the plurality of quality factors.

10. An operating method of an image processing apparatus, the operating method comprising:
- obtaining first frequency coefficient information by converting a first image into a frequency domain in units of blocks having a preset size;
- obtaining correlation information indicating a correlation between at least one block of the first frequency coefficient information and a first kernel;
- obtaining first feature information by performing a convolution operation between the correlation information and a second kernel;
- generating a weight corresponding to the first frequency coefficient information based on the first feature information, wherein the weight indicates reliability of quality information indicated by the at least one block;
- generating second frequency coefficient information by rearranging coefficients included in the first frequency coefficient information, wherein one or more of the coefficients having a same frequency is arranged into a same group; and
- obtaining quality information of the first image based on the weight and the second frequency coefficient information.

11. The operating method of claim 10, wherein the first image comprises an image having a YCbCr color space, and
wherein the operating method further comprises obtaining the first image by performing color space conversion on an image having an RGB color space.

12. A non-transitory computer-readable recording medium having stored therein a program including instructions causing a processor to execute the operating method of claim 10.

* * * * *